Oct. 8, 1946.  F. ROMAIN  2,408,956
HORN WEIGHT
Filed May 24, 1944
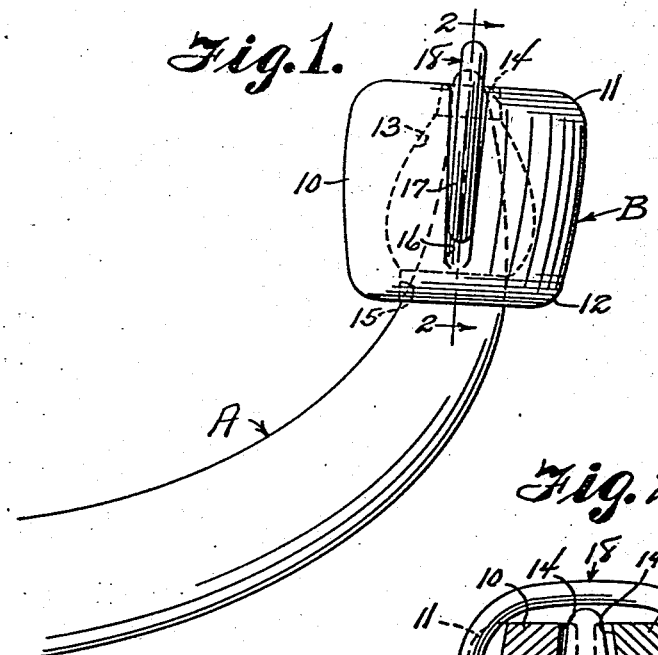
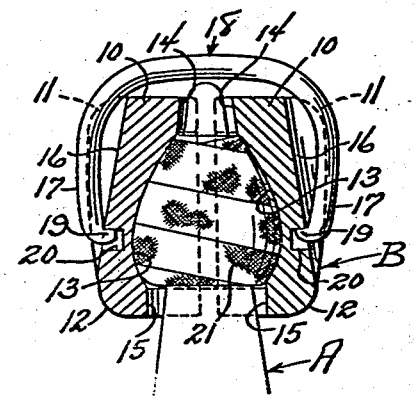
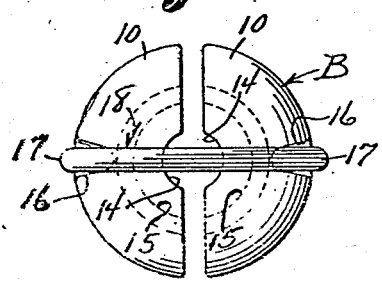
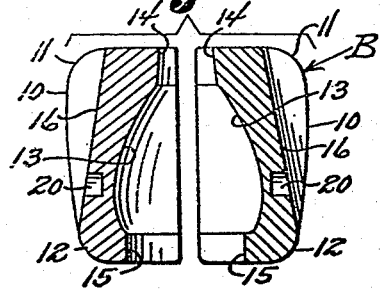
Fred Romain INVENTOR.
BY
*Victor J. Evans & Co.*
ATTORNEYS Patented Oct. 8, 1946

2,408,956

UNITED STATES PATENT OFFICE 2,408,956

HORN WEIGHT

Fred Romain, Chester, Mont.

Application May 24, 1944, Serial No. 537,126

2 Claims. (Cl. 128—76)

The invention relates to a horn attachment for cattle, and more especially to a horn weight for horned animals.

The primary object of the invention is the provision of a weight of this character, wherein the attachment of the same to the horn of an animal is effected without the use of fasteners which bind on the horn of such animal with resultant injury thereto, the weight being for the purpose of shaping the horn during the growth thereof in the wearing of the same.

Another object of the invention is the provision of a weight of this character, wherein the same can be securely made fast to the horn of an animal, and will not work loose during the wearing of the same nor will it become accidentally detached.

A further object of the invention is the provision of a weight of this character, wherein the same is self-adjusting, it being held fast through spring action, and such weight will fit different sizes of horns.

A still further object of the invention is the provision of a weight of this character, which is simple in construction, thoroughly reliable and efficient in its purpose, strong, durable, readily and easily applied and removed at will, eliminates discomfort or injury in the wearing thereof, assures horn shaping of an animal, and inexpensive to manufacture.

With these and other objects in view the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is an elevation of the weight device constructed in accordance with the invention and applied to the horn of an animal.

Figure 2 is a sectional view fragmentarily taken on the line 2—2 of Figure 1 looking in the direction of the arrows.

Figure 3 is a sectional exploded view of the device as shown in the position in Figure 2 with the spring clip removed.

Figure 4 is a top plan view of the device removed from the horn.

Similar reference characters indicate corresponding parts throughout the several views in the drawing.

Referring to the drawing in detail, A designates generally the horn of an animal of the horned type, and is only partly shown in Figure 1 of the drawing, while B denotes generally the weight device constituting the present invention and hereinafter set forth.

The weight device B comprises a pair of opposed matched weight sections or members 10, each having the required inherent weight and is of semi-circular external contour with a rounding edging 11 and 12, respectively, at the top and bottom areas thereof to eliminate sharp corners at such points.

In the inner faces of these sections or members 10 which are partially flattened, are concaved upwardly tapered recesses 13, these being centered and extending vertically for a major length of such faces, to provide anchoring seats in directly opposed relation to each other. These seats merge into relatively shallow and deep notches 14 and 15, respectively, opening through the top and bottom areas of the sections or members 10, which permit the proper fitting of the latter to the horn A as shown in Figures 1 and 2 of the drawing.

Formed in the outer faces of the sections or members 10 midway thereof and opening only through the top areas are upwardly convergent or upwardly tapered leg retaining channels 16 for the legs 17 of an inverted substantially U-shaped springy clip 18 which is adapted to saddle the members or sections 10 when placed in position onto the horn A for the wearing of the same thereon, as is disclosed in Figures 1 and 2 of the drawing.

The legs 17 of the clip 18 have terminal latching hooks 19 which are adapted to snap into keeper holes 20 countersunk in the channels 16 somewhat close to the bottom areas of the members or sections 10, for the securing of the clip in position, and yieldingly holding the said sections or members fixed on the horn A.

The horn A is wrapped with an adhesive taping 21 at the point of application of the device B to effect a lump formation on the said horn for interfitting the seats or recesses 13, for securely anchoring the members or sections 10 in a fixed position on the horn A, as is disclosed in Figure 2 of the drawing.

The application of the weight device B to the horn A does not retard the growth of the latter and encourages the shaping of the same during growth, there being no set screws or other like fasteners used in the fastening of the weight device B on the horn A, as should be apparent, and in this manner obviating injury thereto.

The device B is applicable to different sizes of horns and is used principally with cattle for shaping purposes as previously set forth.

The weight device is readily and easily applied and removed at will, it being preferably worn as disclosed by the drawing.

What is claimed is:

1. A device of the kind described, comprising a pair of similarly constructed weight members having concaved upwardly tapered recesses on the inner faces thereof for disposition in opposed matched relation to each other on a horn of an animal, said recesses merging into relatively shallow and deep notches respectively, opening through the top and bottom areas of the members to permit the proper fitting of said members to said horn, means on the horn conforming to the contour of said recesses for anchor seating of the members thereon, and a springy clamping means engaging only the members for making fast the seating of the members.

2. The invention as in claim 1 wherein external channels are formed in the members for retaining the springy clamping means engaged with said members, and said channels are provided with keeper holes countersunk in said channels and said spring clamping means are provided with terminal latching hooks for engagement with said keeper holes.

FRED ROMAIN.